United States Patent [19]

Perez et al.

[11] 4,266,742
[45] May 12, 1981

[54] RAM WING AIRCRAFT LAUNCH PLATFORM SYSTEM

[75] Inventors: David J. Perez, Xenia; Kenneth P. Schwartz, Fairborn, both of Ohio

[73] Assignee: The United States of America as represented by the Secretary of the Air Force, Washington, D.C.

[21] Appl. No.: 85,662

[22] Filed: Oct. 17, 1979

[51] Int. Cl.³ .................................................. B64F 1/04
[52] U.S. Cl. ...................................... 244/63; 244/100 R
[58] Field of Search ................. 244/2, 34 R, 37, 45 R, 244/63, 50, 100 R, 101, 108, 105, 135 R, 138 R; 180/14 C

[56] References Cited

U.S. PATENT DOCUMENTS

| | | | |
|---|---|---|---|
| 2,135,033 | 11/1938 | Courtney | 244/63 |
| 2,364,803 | 12/1944 | Mayhew | 244/2 |
| 2,585,870 | 2/1952 | Spielman | 244/135 R |
| 2,774,557 | 12/1956 | Jakimiuk et al. | 244/63 |
| 2,798,729 | 7/1957 | Paul | 180/14 C |
| 2,919,043 | 12/1959 | Sharp | 180/14 C |
| 3,963,196 | 6/1976 | Walker | 244/63 |

FOREIGN PATENT DOCUMENTS

| | | | |
|---|---|---|---|
| 835594 | 12/1938 | France | 244/63 |
| 1007644 | 2/1952 | France | 244/63 |
| 56525 | 9/1952 | France | 244/63 |

Primary Examiner—Galen L. Barefoot
Attorney, Agent, or Firm—Donald J. Singer; Richard J. Killoren

[57] ABSTRACT

A launch platform for conventional landing gear aircraft having the launch platform configured as a ram wing structure with wheel latches secured to the platform. The platform is secured to the aircraft by means of the wheel latches. The wheel latches are released to permit the aircraft to leave the platform by pilot command. A parachute system is provided for platform deceleration after aircraft take-off. Spoilers are provided on the ram wing for stabilization of the ram wing during rotation.

4 Claims, 7 Drawing Figures

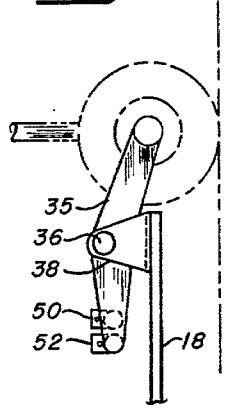
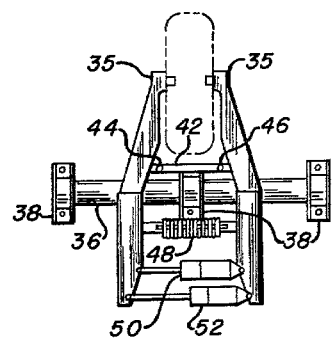
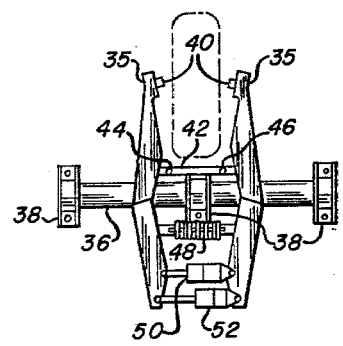
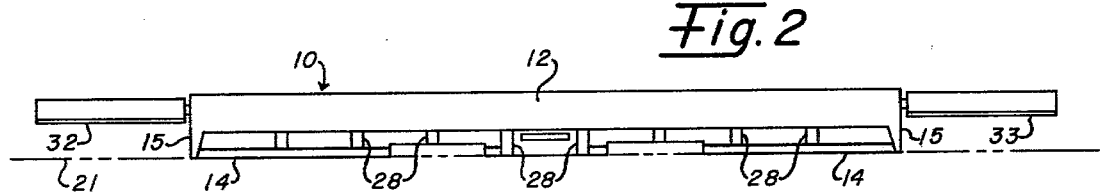

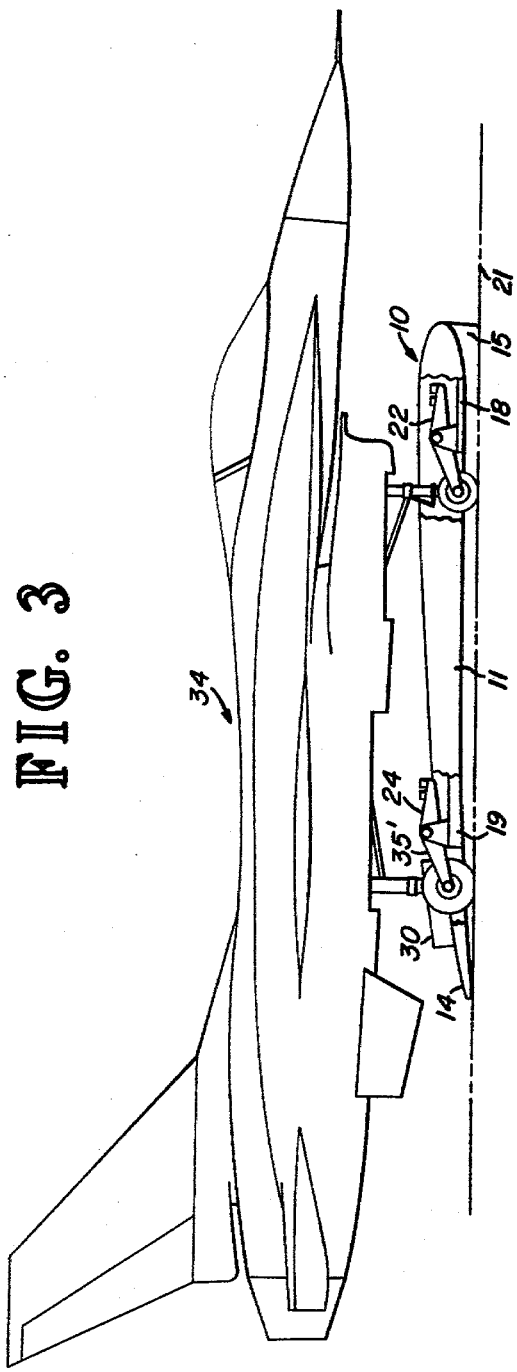

RAM WING AIRCRAFT LAUNCH PLATFORM SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a launch system for landing gear aircraft to permit operation on damaged runways.

The U.S. Pat. Nos. to Dornier et al, 3,070,327; to Doriner, 3,082,976; and the patents to Lippisch, 3,190,582; 3,627,235; and 3,830,448 describe various ground effect take-off and landing systems.

Battle damaged runways will sometimes have undamaged sections from which conventional landing gear aircraft could operate but do not have sufficient undamaged runway to permit aircraft take-offs. Normally such a damaged runway would be unavailable for use by aircraft with conventional landing gear until the runway is repaired.

BRIEF SUMMARY OF THE INVENTION

According to this invention a ram wing launch platform is provided to permit take-offs from battle damaged runways. Wheel latches are mounted on the platform and secure the platform to the aircraft. The wheel latches and parachute are operated by pilot operated switches. A pair of spoilers are provided which are controlled by pilot operated servo control, to stabilize the platform during take-off and aircraft rotation. A parachute system is provided to decelerate the platform after aircraft take-off.

IN THE DRAWINGS

FIG. 1 is a partially schematic top view of a launch platform according to the invention.

FIG. 2 is a partially schematic front projection of the launch platform of FIG. 1.

FIG. 3 is a partially schematic side view of the device of FIG. 2.

FIG. 4 is a side view of the latching mechanism used with nose landing gear of the device of FIG. 1.

FIG. 5 is a top view of the device of FIG. 4.

FIG. 6 shows the device of FIG. 5 in its release position.

DETAILED DESCRIPTION OF THE INVENTION

Figure 7:
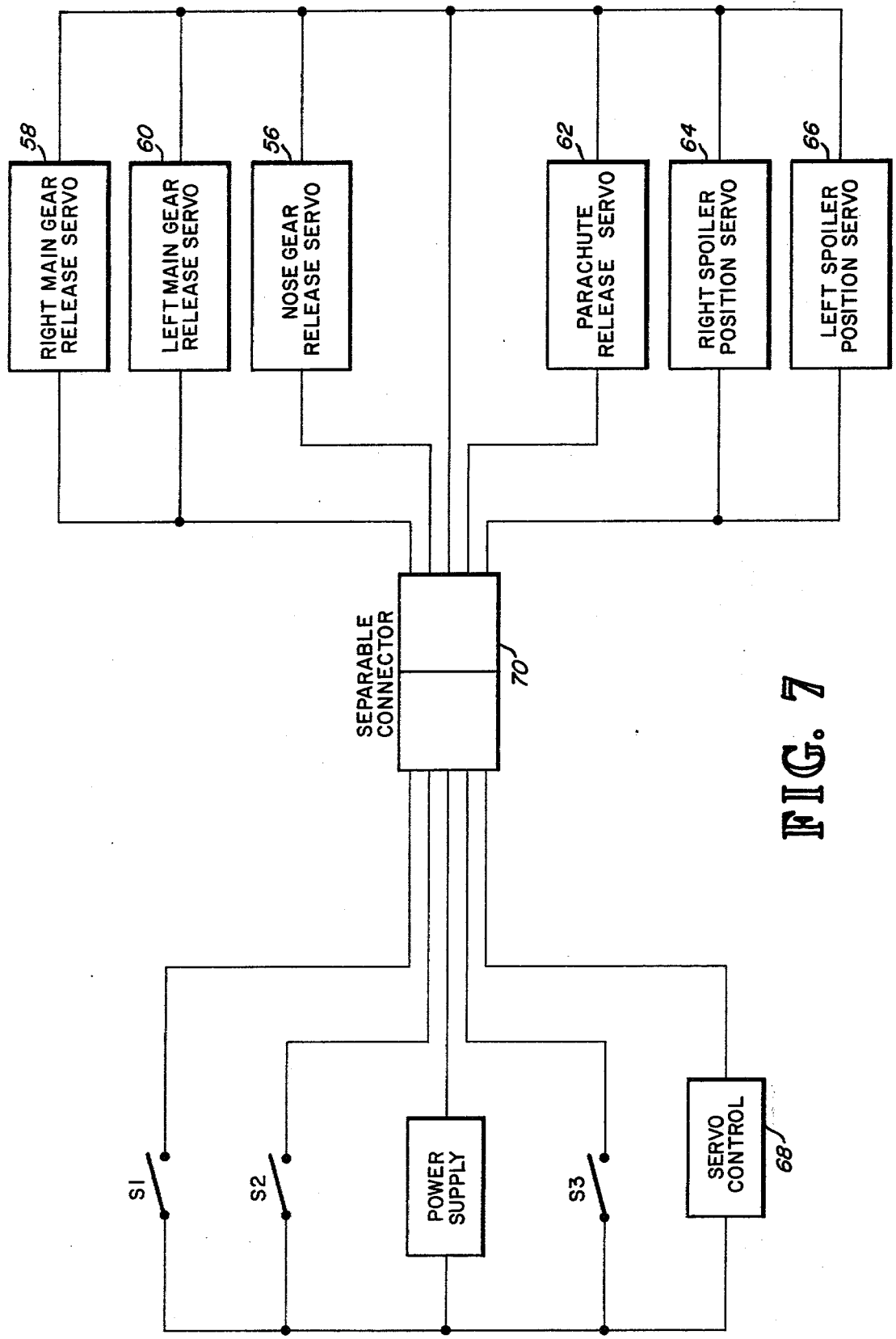
FIG. 7 is a schematic block diagram of a control circuit for the device of FIGS. 1, 2 and 3.

Reference is now made to FIG. 1 of the drawing which shows a ram wing launch platform 10 which includes an airfoil shaped body member 11 which includes a flexible trailing edge member 14 and flexible side members 15, shown in FIG. 2. The airfoil body member 11 is a conventional airfoil structure with a plurality of ribs 12, a plurality of spars 13, tied together with cable rigging indicated at 17. The airfoil may be covered with conventional skin material such as advance composite structure or aluminum honeycomb skin surface layers. An opening 16 is provided adjacent the forward portion of the platform for receiving the nose wheel of an aircraft as shown in FIG. 3. The ground is indicated by line 21. Cutout portions 20, at the trailing portion of ram wing, are adapted to receive the aircraft main landing gear. A conventional nose gear latch mechanism 22, as shown in greater detail in FIGS. 4, 5 and 6, is secured to the ram wing platform 18 adjacent opening 16. Similar main gear latch mechanisms 24 and 26 are secured to the ram wing platforms 19 adjacent openings 20. The platforms 18 and 19 are secured to the structural support ribs 12 and spars 13. Replaceable skids 28 may be secured to the bottom of the platform to prevent abrasion of the platform during deceleration of the ram wing platform after aircraft release. A conventional deceleration parachute 30 is secured to the ram wing platform. A pair of spoilers 32 and 33 are provided on the platform and are rotated to a position of negative lift upon release of the nose gear latch mechanism to stabilize the aircraft platform during rotation and take-off.

The aircraft 34 is secured to the platform by means of a nose gear latch mechanism 22 and main gear latch mechanisms 24 and 26.

The nose gear latch mechanism and main gear latch mechanism are conventional latch mechanism which would be adapted for use with the particular aircraft secured to the platform.

The nose gear latch mechanism includes a pair of lever arm members 35 which are secured to a shaft 36 with two degrees of freedom. The shaft 36 is secured to the platform 12 by means of brackets 38. Pin members 40 on arm members 35 engage the hollow axle of the nose wheel hub. A pivot bar 42 is secured to lever arms 35 at 44 and 46. Spring 48 holds the shaft members 40 in engagement with the wheel hub. A pair of servo controlled latch actuators 50 and 52 move arms 35 around pivots 44 and 46 to release the nose gear from the latch mechanism.

The latch mechanisms 24 and 26 for the main gear are substantially the same as the latch mechanism 22, except that they are larger and have lever arm members 35' adapted to fit the axle on the main gear. The particular latch mechanism used would depend upon the structure of the particular landing gear.

The operation of the servos for controlling release of latches 22, 24 and 26, the release of the parachute 30 and the positioning of the spoilers 32 and 33 could be controlled from the aircraft, as shown in FIG. 7 wherein a command signal from the aircraft, for example a command signal for operating nose gear servo 56 for release of the nose gear latch 22 is indicated by switch $S_2$; a command signal for operating main gear servos 58 and 60 for release of the main gear latches 24 and 26 is indicated by switch $S_1$; a command signal for operating the parachute release servo 62 for release of the parachute 30 is indicated by switch $S_3$; and a command signal for operating the right and left spoiler position servos 64 and 66 to position the spoilers for negative lift is indicated servo control 68. The command signals would be supplied to servos 56, 58, 60, 62, 64 and 66 through a conventional umbilical including a conventional separable connector 70.

In the operation of the device the aircraft is taxied onto the ram wing platform and the wheel latches 22, 24 and 26 are secured to the nose gear and main gear wheel hubs. The platform need be stressed for only approximately 20% of the aircraft weight since only the nose wheel passes over the platform. During the initial portion of the take-off maneuver the aircraft is supported upon the nose gear and main gear. As the aircraft speed increases, the support of the aircraft is shifted from the conventional gear to the ram wing platform. When the pilot determines that take-off speed has been reached, switch $S_2$ is operated to release the nose gear and spoilers 32 and 33 are positioned for negative lift to stabilize the platform during rotation. When the aircraft has assumed the proper altitude, switch $S_1$ is operated to release the main gear latches 24 and 26 and switch $S_3$ is operated to release the main parachute 30. After aircraft take-off the parachute 30 slows the platform 10.

While the use of the launch platform of the invention will require approximately 10 to 15 percent increase in take-off distance due to the added drag on the aircraft, it can permit more rapid response to bombings since aircraft do not have to wait for complete repair of runways since aircraft can take off over rough surfaces with a minimum of repair required, for example filling in the large holes with earth moving equipment.

There is thus provided a launch platform system for launching aircraft from rough or bomb damaged runways.

We claim:

1. A platform launch system for aircraft having conventional wheel landing gear, comprising: a ram wing having a plurality of openings to permit the aircraft nose landing gear wheel and the aircraft main landing gear wheels to extend through the ram wing to contact the runway surface; means, supported on said ram wing, for securing the nose landing gear wheel to the ram wing; means, supported on said ram wing for securing the main landing gear wheels to the ram wing; means for releasing the nose landing gear wheel and the main landing gear wheels from the ram wing.

2. The device as recited in claim 1 wherein said means for securing the nose landing gear wheel to the ram wing includes a latch mechanism for engaging the nose landing gear wheel hub; said means for securing the main landing gear wheels to the ram wing includes latch mechanisms for engaging the main landing gear wheel hubs.

3. The device as recited in claim 2 wherein said means for releasing the nose landing gear wheel and the main landing gear wheels from the ram wing includes means responsive to a command signal from the aircraft, for releasing the nose wheel latch mechanism and for releasing the main wheel latch mechanism.

4. The device as recited in claim 3 including a deceleration parachute secured to the ram wing; means responsive to a command signal from the aircraft for releasing said parachute; a first spoiler member connected to the left side of said ram wing and a second spoiler connected to the right side of the ram wing; means, responsive to a command signal from the aircraft, for positioning the spoilers for negative lift to stabilize the ram wing during aircraft take-off and rotation.

* * * * *